(12) United States Patent
Zhang (10) Patent No.: US 11,336,384 B2
(45) Date of Patent: May 17, 2022

(54) SYNCHRONIZATION SIGNAL MEASUREMENT METHOD AND RELATED DEVICE

(71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 224 days.

(21) Appl. No.: 16/495,230

(22) PCT Filed: Mar. 24, 2017

(86) PCT No.: PCT/CN2017/078072
§ 371 (c)(1),
(2) Date: Sep. 18, 2019

(87) PCT Pub. No.: WO2018/170879
PCT Pub. Date: Sep. 27, 2018

(65) Prior Publication Data
US 2020/0028606 A1    Jan. 23, 2020

(51) Int. Cl.
*H04J 11/00* (2006.01)
*H04W 56/00* (2009.01)
*H04W 48/10* (2009.01)

(52) U.S. Cl.
CPC ..... *H04J 11/0073* (2013.01); *H04J 2211/005* (2013.01)

(58) Field of Classification Search
None
See application file for complete search history.

(56) References Cited

U.S. PATENT DOCUMENTS

| 2011/0183661 | A1  | 7/2011 | Yi et al. |
| 2018/0213493 | A1* | 7/2018 | Chakraborty ......... H04L 1/1692 |
| 2020/0022040 | A1* | 1/2020 | Chen ................. H04W 36/0085 |

FOREIGN PATENT DOCUMENTS

| CN | 104219758 | 12/2014 |
| JP | 2015070330 | 4/2015 |

(Continued)

OTHER PUBLICATIONS

DL Signal for Mobility Measurements in NR, 3GPP TSG-RAN WG1 NR AH Meeting R1-1701063, Jan. 16-20, 2017 (Year: 2017).*

(Continued)

*Primary Examiner* — Jeffrey M Rutkowski
*Assistant Examiner* — Ning Li
(74) *Attorney, Agent, or Firm* — Hodgson Russ LLP (57) ABSTRACT

Transmitting, by the network device, the configuration information to a user equipment, wherein the configuration information is used to instruct the user equipment to use a measurement set to measure a synchronization signal, wherein the measurement set is used by a user equipment in a connected state to measure a synchronization signal, the measurement set is a first synchronization signal block (SS block) set, and the first SS block set includes a number of SS blocks smaller than a number of SS blocks included in a second SS block set which includes an SS block used by the user equipment in an idle state to measure the synchronization signal; or the measurement set is a signal set, and the signal set includes a part of signals in Y SS blocks, and Y is a positive integer.

6 Claims, 7 Drawing Sheets

(56) References Cited

FOREIGN PATENT DOCUMENTS

| JP | 2017060182 | 3/2017 |
|----|------------|--------|
| TW | 201608917  | 3/2016 |

OTHER PUBLICATIONS

Discussion on RRM measurement in NR, 3GPP TSG RAN WG1 Meeting #88 R1-1702443, Feb. 13-17, 2017 (Year: 2017).*

LG Electronics, "Discussion on RRM measurement in NR," 3GPP TSG RAN WG1 Meeting #88, R1-1702443, Feb. 2017, 6 pages.

Nokia et al., "Mobility Measurement in Idle and Inactive Mode," 3GPP TSG-RAN WG2 Meeting #96, R2-167712, Nov. 2016, 5 pages.

Samsung, "Cell-specific measurement for beam management," 3GPP TSG RAN WG1 NR Ad Hoc, R1-1700916, Jan. 2017, 4 pages.

WIPO, ISR for PCT/CN2017/078072, Dec. 27, 2017.

EPO, Communication for EP Application No. 17902471.6, dated Nov. 5, 2020.

IPI, Office Action for IN Application No. 201917037559, dated Nov. 24, 2020.

SIPO, Second Office Action for CN Application No. 201780088575.5, dated Aug. 12, 2020.

Samsung, "Discussion on LDPC Code Design-Discussion and Decision", 3GPP TSG RAN WG1 NR Ad-Hoc Meeting, R1-1700976, Jan. 16, 2017, Spokane, USA.

MCC Support, "Draft Report of 3GPP TSG RAN WG1 #AH1_NR v0.1.0," 3GPP TSG RAN WG1 Meeting #88, R1-17xxxxx, Feb. 2017, 106 pages.

Nokia et al., "DL Signals for Mobility Measurements in NR," 3GPP TSG-RAN WG1 NR AH Meeting, R1-1701063, Jan. 2017, 11 pages.

EPO, Office Action for EP Application No. 17902471.6, dated Mar. 11, 2020.

SIPO, First Office Action for CN Application No. 201780088575.5, dated May 13, 2020.

NTT Docomo, Inc., "Discussion on RS design for NR RRM measurement," 3GPP TSG RAN WG1 Meeting #88, R1-1702832, Feb. 2017, 10 pages.

Samsung et al., "WF on Mobility," 3GPP TSG RAN WG1 NR Ad-Hoc Meeting, R1-1701376, Jan. 2017, 4 pages.

JPO, Office Action for JP Application No. 2019-552555, dated Mar. 30, 2021.

KIPO, Office Action for KR Application No. 10-2019-7030184, dated Jan. 24, 2021.

TIPO, Office Action for TW Application No. 107105085, dated Jun. 22, 2021.

EPO, Communication for EP Application No. 17902471.6, dated Apr. 30, 2021.

* cited by examiner

SYNCHRONIZATION SIGNAL MEASUREMENT METHOD AND RELATED DEVICE

CROSS-REFERENCE TO RELATED APPLICATION

This application is a U.S. national phase application of International Application No. PCT/CN2017/078072, filed Mar. 24, 2017, the entire disclosure of which is incorporated herein by reference.

TECHNICAL FIELD

The present application relates to the field of communication technologies, and in particular, to a method for measuring a synchronization signal and related devices.

BACKGROUND

A synchronization signal is a signal that provides a same time reference to machinery equipment that need to process information synchronously. The New Ratio (NR)/5G Multi-beam system covers the entire cell with different beams. Each beam corresponds to one synchronization block (SS block), and an SS block includes at least a primary synchronization signal (PSS), a secondary synchronization signal (SSS), and a physical broadcast channel (PBCH).

In the Long Term Evolution (LTE) system, the measurement of mobility management is based on cell reference RS (CRS), which assists the base station to manage the mobility by measuring signal strength of CRSs of different cells. In the NR/5G system, the measurement of mobility management is based on SS block instead. The SS block is designed for a terminal to make an initial cell search (cell search), so PSS/SSS is required to provide cell ID, and PBCH is required to provide key system information related to the cell. When the user equipment is in the idle mode, the measurement terminal for mobility management usually needs to measure the complete SS block. If the user equipment is in the connected mode, the measurement of mobility management also follows the measurement mechanism when the user equipment is in an idle state, which may cause unnecessary waste of terminal resources. Therefore, how to measure the mobility management when the user equipment is in the connected state is a technical problem that needs to be solved.

SUMMARY

Embodiments of the present application provide a method for measuring a synchronization signal and related devices, which are used for measuring mobility management when a user equipment is in a connected state.

In a first aspect, embodiments of the present application provide a method for measuring a synchronization signal, comprising:
generating, by a network device, configuration information;
transmitting, by the network device, the configuration information to a user equipment, wherein the configuration information is used to instruct the user equipment to use a measurement set to measure a synchronization signal, wherein the measurement set is used by the user equipment in a connected state to measure a synchronization signal, the measurement set is a first SS block set, and the number of SS blocks included in the first SS block set is smaller than the number of SS blocks included in a second SS block set which comprises an SS block used by the user equipment in an idle state to measure a synchronization signal; or the measurement set is a signal set, and the signal set comprises a part of signals in Y SS blocks, and Y is a positive integer.

In a second aspect, embodiments of the present application provide a method for measuring a synchronization signal, comprising:
receiving, by a user equipment, configuration information sent by a network device, wherein the configuration information is used to instruct the user equipment to use a measurement set to measure a synchronization signal, wherein the measurement set is used by the user equipment in a connected state to measure a synchronization signal, the measurement set is a first SS block set, and the number of SS blocks included in the first SS block set is smaller than the number of SS blocks included in a second SS block set which comprises an SS block used by the user equipment in an idle state to measure a synchronization signal; or the measurement set is a signal set, and the signal set comprises a part of signals in Y SS blocks, and Y is a positive integer;
adopting, by the user equipment, the measurement set to measure a synchronization signal when the user equipment is in a connected state.

In a third aspect, embodiments of the present application provide a network device, comprising:
a processing module configured to generate configuration information;
a transmitting module configured to transmit the configuration information to a user equipment, wherein the configuration information is used to instruct the user equipment to use a measurement set to measure a synchronization signal, wherein the measurement set is used by the user equipment in a connected state to measure a synchronization signal, the measurement set is a first SS block set, and the number of SS blocks included in the first SS block set is smaller than the number of SS blocks included in a second SS block set which comprises an SS block set used by the user equipment in an idle state to measure a synchronization signal; or the measurement set is a signal set, and the signal set comprises a part of signals in Y SS blocks, and Y is a positive integer.

In a fourth aspect, embodiments of the present application provide a user equipment, comprising:
a receiving module configured to receive configuration information sent by a network device, wherein the configuration information is used to instruct the user equipment to use a measurement set to measure a synchronization signal, wherein the measurement set is used by the user equipment in a connected state to measure a synchronization signal, the measurement set is a first SS block set, and the number of SS blocks included in the first SS block set is smaller than the number of SS blocks included in a second SS block set which comprises an SS block used by the user equipment in an idle state to measure a synchronization signal; or the measurement set is a signal set, and the signal set comprises a part of signals in Y SS blocks, and Y is a positive integer;
a processing module configured to adopt the measurement set to measure a synchronization signal when the user equipment is in a connected state.

In a fifth aspect, embodiments of the present application provide a network device comprising a processor, a memory, a transceiver and a communication bus,
wherein the processor is coupled to the memory and the transceiver via the communication bus so as to complete communications with each other;
the memory stores executable program instructions, and the processor is configured to invoke executable program code in the memory to perform the methods as described in the first aspect of embodiments of the present application.

In a sixth aspect, embodiments of the present application provide a user equipment comprising a processor, a memory, a transceiver and a communication bus,
wherein the processor is coupled to the memory and the transceiver via the communication bus so as to complete communications with each other;
the memory stores executable program instructions, and the processor is configured to invoke executable program code in the memory to perform the methods as described in the second aspect of embodiments of the present application.

In a seventh aspect, the present application provides a computer storage medium for storing computer software instructions used by the network device provided in the fifth aspect of embodiments of the present application, which includes a program designed to perform the first aspect of embodiments of the present application.

In an eighth aspect, the present application provides a computer storage medium for storing computer software instructions used by the user equipment provided in the sixth aspect of embodiments of the present application, which includes a program designed to perform the second aspect of embodiments of the present application.

In a ninth aspect, embodiments of the present application provide a communication system comprising the network device as described in the third aspect of embodiments of the present application and the user equipment as described in the fourth aspect of embodiments of the present application.

In the solutions, the measurement mechanism of the user equipment in the connected state is to measure the synchronization signal based on the configuration information configured by the network device, and the solutions are more flexible than the measurement mechanism when the user equipment is in the idle state. In addition, the measurement mechanism of the user equipment is to measure the synchronization signal based on the measurement set which is a first SS block set, and the number of SS blocks included in the first SS block set is less than the number of SS blocks included in the second SS block set which includes all SS blocks used by the user equipment to measure the synchronization signal in an idle state, or the measurement set is a signal set which includes a part of signals in the Y SS blocks. Compared to following measurement when the user equipment is in an idle state, the measurement method of the present solution has a shorter measurement time, thereby improving the performance of the user equipment to detect the synchronization signal.

These and other aspects of the present application will be more readily apparent from the following description of the embodiments.

BRIEF DESCRIPTION OF THE DRAWINGS

Accompanying drawings used to describe embodiments or the prior art will be introduced briefly below in order to illustrate the technical solutions of embodiments of the present application or the prior art more clearly. Obviously, the accompanying drawings in the following description are merely for some embodiments of the present application, and other drawings can also be obtained based on these accompanying drawings by a person having ordinary skill in the art without creative efforts.

DETAILED DESCRIPTION

In order to make those skilled in the art understand solutions of the present application better, the technical solutions in the embodiments of the present application are clearly and completely described in the following with reference to the accompanying drawings in the embodiments of the present application. Only a part, not all, of embodiments of the present application is described. All other embodiments obtained by a person of ordinary skill in the art based on the embodiments of the present application without any inventive labor shall fall within the protection scope of the application.

The details are described below separately.

The terms "first", "second", "third", and "fourth" and the like in the specification and claims of the present application and the drawings are used to distinguish different objects, and are not used to describe a specific order. Furthermore, the terms "comprises", "comprising" and any other forms thereof are intended to cover a non-exclusive inclusion. For example, a process, method, system, product, or device that comprises a series of steps or units is not limited to the listed steps or units, but optionally also includes steps or units not listed, or optionally also includes other steps or units inherent to these processes, methods, products or equipment.

References to "an embodiment" herein mean that a particular feature, structure, or characteristic described in connection with the embodiment can be included in at least one embodiment of the present application. The appearances of the phrase in various places in the specification are not necessarily referring to the same embodiment, and are not mutually exclusive, independent or alternative with respect to other embodiments. Those skilled in the art will understand and implicitly understand that the embodiments described herein can be combined with other embodiments.

Embodiments of the present application will be described below with reference to the accompanying drawings.

Figure 1:
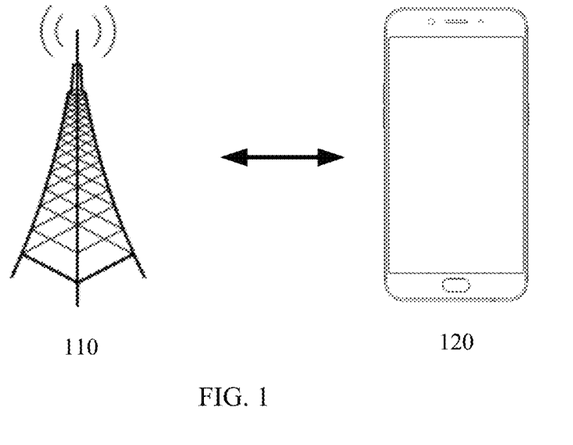
FIG. 1 is a schematic diagram of a network architecture provided by embodiments of the present application.

Please refer to FIG. 1. FIG. 1 is a schematic diagram of a network architecture disclosed in an embodiment of the present application. The network architecture shown in FIG. 1 includes a network device 110 and a user equipment 120. The network device 110 sends configuration information configured by the network device 110 to the user equipment 120. After the user equipment 120 receives the configuration information sent by the network device 110, if the user equipment 120 is in the connected state, the user equipment 120 measures a synchronization signal based on the configuration information configured by the network device, which is more flexible than following the measurement mechanism when the user equipment 120 is in an idle state. In addition, the configuration information is used to instruct the user equipment 120 to use the measurement set to measure the synchronization signal, wherein the measurement set is a first SS block set, and the number of SS blocks included in the first SS block set is smaller than the number of SS blocks included in the second SS block set which includes SS blocks used by the user equipment to measure the synchronization signal in an idle state, or the measurement set is a signal set which includes a part of signals in the Y SS blocks. Compared to following measurement when the user equipment is in an idle state, the present solution has a shorter measurement time, thereby improving the performance of the user equipment to detect the synchronization signal.

The User Equipment (UE) is a device that provides voice and/or data connectivity to a user, for example, a handheld device with a wireless connection function, an in-vehicle device, and the like. Common terminals include, for example, mobile phones, tablets, notebook computers, PDAs, mobile internet devices (MIDs), and wearable devices such as smart watches, smart wristbands, pedometers, and the like.

The network device refers to a node device on the network side. For example, the network device may be a radio access network (RAN) device on the access network side of the cellular network, and the so-called RAN device is a device that connects the terminal to the wireless network, including but not limited to: an evolved Node B (eNB), a radio network controller (RNC), a Node B (NB), and a base station controller (BSC), Base Transceiver Station (BTS), home base station (for example, Home evolved NodeB, or Home Node B, HNB), BaseBand Unit (BBU); for another example, the network device can also be a node device in a Wireless Local Area Network (WLAN), such as an access controller (AC), a gateway, or a WIFI access point (AP) or the like.

The method for measuring a synchronization signal provided by embodiments of the present application will be described in detail below with reference to the network architecture shown in FIG. 1.

Figure 2A:
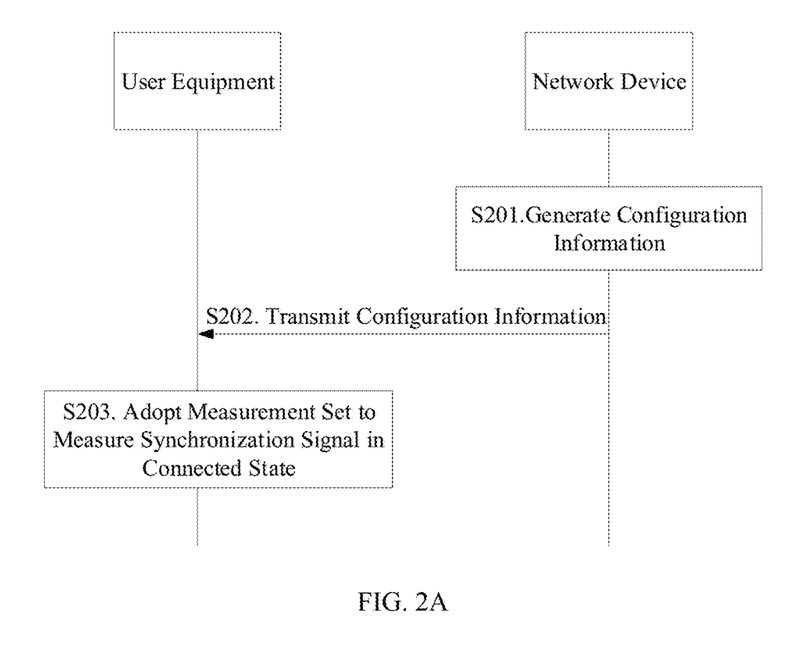
FIG. 2A is a schematic flowchart of a method for measuring a synchronization signal according to an embodiment of the present application.

Referring to FIG. 2A, FIG. 2A is a schematic flowchart of a method for measuring a synchronization signal according to an embodiment of the present application, including the following steps:

Step S201: a network device generates configuration information.

Step S202: the network device sends the configuration information to a user equipment, wherein the configuration information is used to instruct the user equipment to use a measurement set to measure a synchronization signal, wherein the measurement set is used by the user equipment in a connected state to measure a synchronization signal, the measurement set is a first SS block set, and the number of SS blocks included in the first SS block set is smaller than the number of SS blocks included in a second SS block set which comprises an SS block set used by the user equipment in an idle state to measure a synchronization signal; or the measurement set is a signal set, and the signal set comprises a part of signals in Y SS blocks, and Y is a positive integer.

In an embodiment, the signal set contains fewer signals than the second SS block set contains.

Figure 2B:
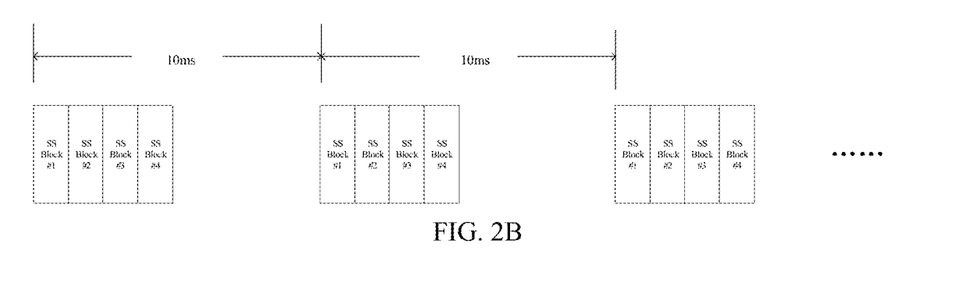
FIG. 2B is a schematic diagram of a second SS block set provided by an embodiment of the present application.

Specifically, suppose a system contains 4 beams, and 4 SS blocks are transmitted on 4 beams in a period of 10 ms, and each beam corresponds to one SS block. The four SS blocks are different from each other, which are SS block #1, SS block #2, SS block #3, and SS block #4, then the combination of the four SS blocks become an SS burst set within the period of 10 ms. The measurement mechanism of the user equipment in the idle state is usually to direct at all the SS blocks that the user equipment can find when the user equipment is in the idle state for initial access. Therefore, the second SS block set can be as shown in FIG. 2B. As shown in FIG. 2B, the second SS block set is composed of multiple SS burst sets, and there is one SS burst set every 10 ms, and the four SS blocks included in each SS burst set are all the same ones. It should be noted that the arrangement of the four SS blocks in the period of 10 ms as shown in FIG. 2B is only one possible arrangement, which is not limited in this application.

Figure 2C:
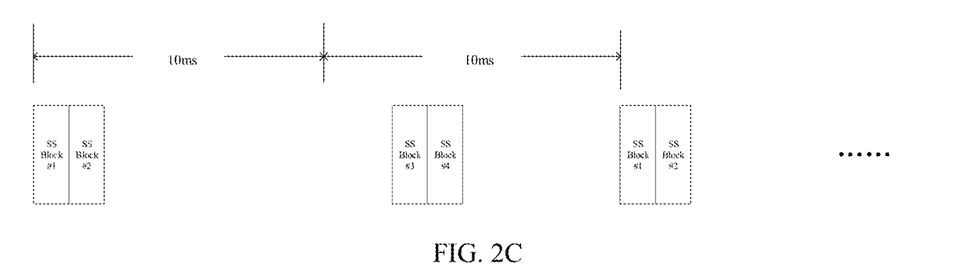
FIG. 2C is a schematic diagram of a first SS block set provided by an embodiment of the present application.

The first SS block set contains less SS blocks than the second SS block set. The first SS block set may be as shown in FIG. 2C. As shown in FIG. 2C, the first SS block set is also composed of multiple SS burst sets, and there is one SS burst set every 20 ms, and the four SS blocks included in each SS burst set are all the same ones.

Figure 2D:
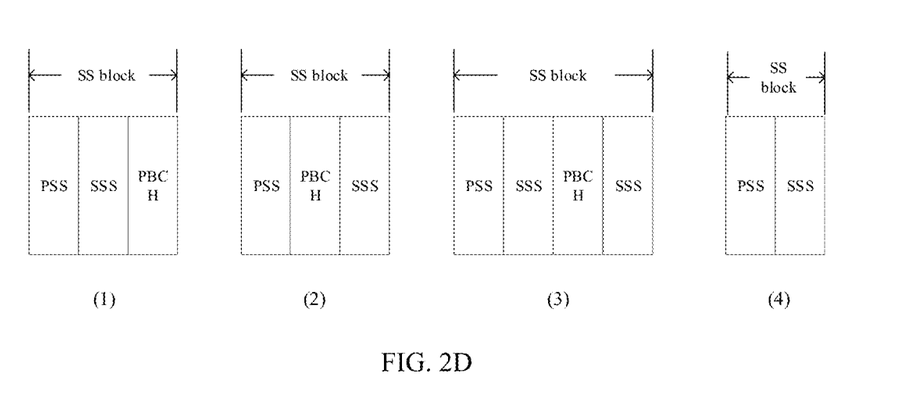
FIG. 2D is a schematic diagram of a form of an SS block provided by an embodiment of the present application.
Figure 2E:
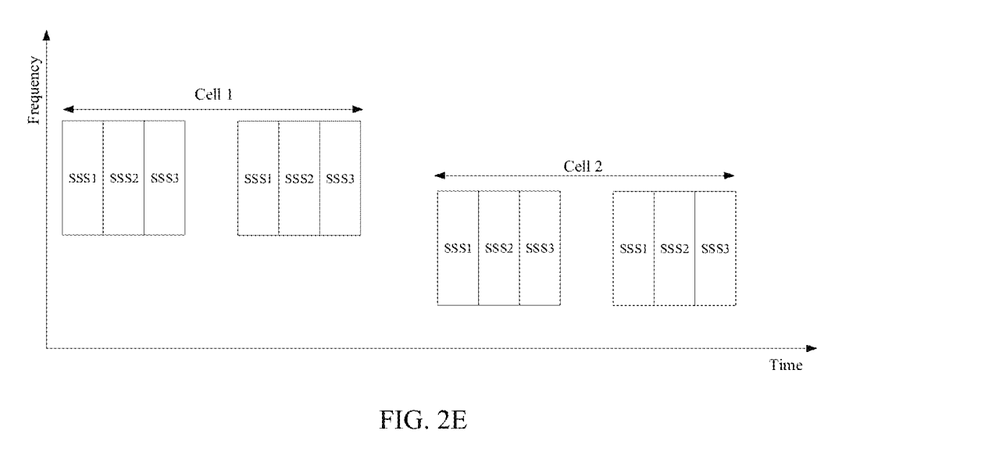
FIG. 2E is a schematic diagram of a signal set provided by an embodiment of the present application.
Figure 2F:
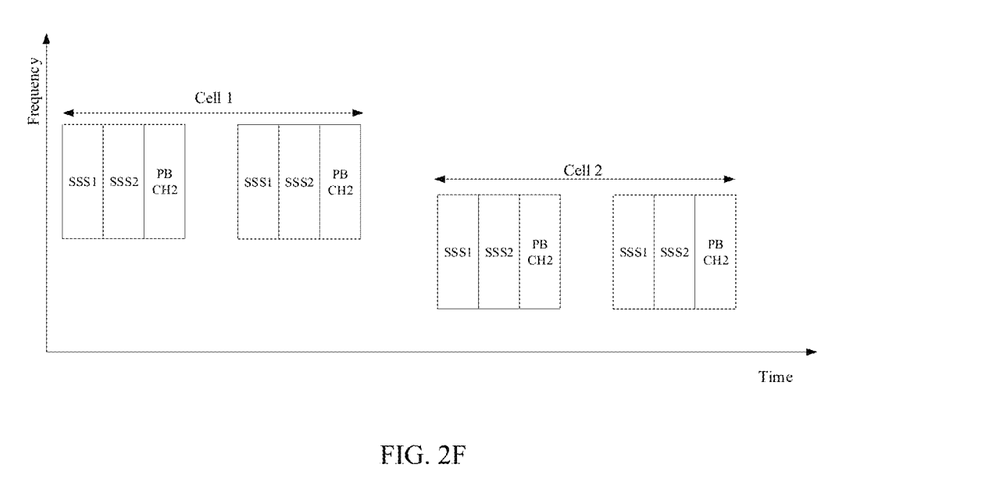
FIG. 2F is a schematic diagram of another signal set provided by an embodiment of the present application.

Specifically, four possible forms of an SS block are shown in FIG. 2D. As shown in FIG. 2D, an SS block may include a PSS, an SSS, and a PBCH, or an SS block may include a PSS, 2 SSSs, and a PBCH, or an SS block may include a PSS, and an SSS. It is assumed that each of 4 SS blocks which are transmitted on 4 beams in each period of 10 ms includes a PSS, an SSS and a PBCH. The measurement set is a signal set, and the signal set includes a part of signals in Y SS blocks. Assuming that the part of the signals in the SS blocks only include the SSS, the signal set is as shown in FIG. 2E. As shown in FIG. 2E, the signal set is made of SSSs in a TDM manner from different SS blocks (i.e., from different beams). For example, SSS1 is from SS block #1, SSS2 is from SS block #2, and so on. Assuming that the part of signals in the SS blocks include the SSS and partial PBCH, the signal set is as shown in FIG. 2F. As shown in FIG. 2F, the signal set is made of the SSS and the PBCH in a TDM manner from different SS blocks (i.e., from different beams). For example, SSS1 comes from SS block #1, SSS2 comes from SS block #2, PBCH2 comes from SS block #2, and so on.

Figure 2G:
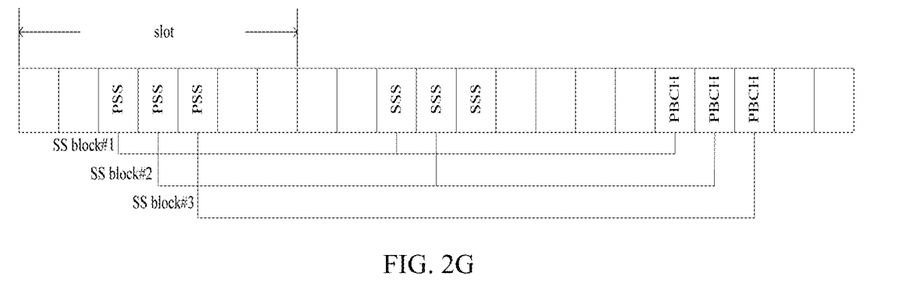
FIG. 2G is a schematic diagram of another form of an SS block provided by an embodiment of the present application.

In addition, in FIG. 2G, for the sake of simplicity, different SS blocks are drawn as separate blocks, but another possible form is the case where different SS block signals are crossed, as shown in FIG. 2G below which shows a schematic diagram of different crossed SS block signals. Also shown in FIG. 2F is separate blocks representative of SS block #1, SS block #2, SS block #3 as in FIG. 2B.

In an embodiment, the second SS block set is an SS block set when the user equipment is in an idle state for initial access, and the second SS block set includes the first SS block set.

Specifically, the second SS block set includes the first SS block set, that is, the first SS block set is a SS block subset of the second SS block set. See FIG. 2B and FIG. 2C for details.

In an embodiment, when the measurement set is the first SS block set, the configuration information includes at least one of the following: 1) a measurement period of the SS block; 2) a time offset; 3) first indication information which is used to instruct the user equipment to adopt N designated SS blocks in the second SS block set in each SS block period to measure a synchronization signal, wherein N is a positive integer.

For example, assuming the configuration information includes the above conditions 1), 2), and 3), the second SS block set is as shown in FIG. 2B, the measurement period of the SS block is 20 ms, and the above time offset is time offset of measurement signals in 2 adjacent SS block periods, which is 10 ms, the SS block period is 10 ms; and in the first SS block period, the SS block #1 and the SS block #2 in the first SS block period in the second SS block set are used to measure the synchronization signal; in the second SS block period, the SS block #3 and the SS block #4 in the second SS block period in the second SS block set are used to measure the synchronization signal; and in the third SS block period, the SS block #1 and the SS block #2 in the third SS block period in the second SS block set are used to measure the synchronization signal, and so on and so forth. Then, according to the configuration information, the first SS block set of the terminal device, the first SS block set can be known as specifically shown in FIG. 2C based on the above configuration information.

In addition, the first indication information may be indicated in the form of a bitmap. For example, in the first SS block period, the SS block #1 and the SS block #2 in the first SS block period in the second SS block set are used to measure the synchronization signal, and the bitmap of the first SS block period is 1100; in the second SS block period, the SS block #3 and the SS block #4 in the second SS block period in the second SS block set are used to measure the synchronization signal, and the bitmap of the second SS block period is 0011; and in the third SS block period, the SS block #1 and the SS block #2 in the third SS block period in the second SS block set are used to measure the synchronization signal, and the bitmap of the third SS block period is 1100.

Figure 2H:
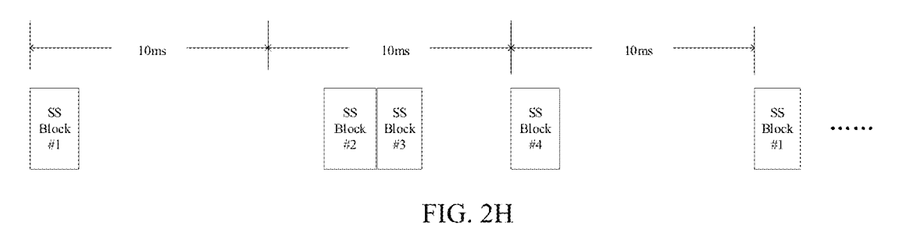
FIG. 2H is a schematic diagram of another first SS block set provided by an embodiment of the present application.

For another example, assuming that the configuration information includes the above conditions 1), 2), and 3), the second SS block set is as shown in FIG. 2B, the measurement period of the SS block is 30 ms, and the above-mentioned time offset is time offset of measurement signals in 2 adjacent SS block periods, which is 10 ms; and in the first SS block period, the SS block #1 in the first SS block period of the second SS block set is used to measure the synchronization signal; in the second SS block period, the SS block #2 and the SS block #3 in the second SS block period of the second SS block set are used to measure the synchronization signal; and in the third SS block period, the SS block #4 in the third SS block period in the second SS block set is used to measure the synchronization signal; and in the fourth SS block period, the SS block #1 in the fourth SS block period in the second SS block set is used to measure the synchronization signal; and so on and so forth. Then, according to the foregoing configuration information, the first SS block set can be known as specifically shown in FIG. 2H.

In addition, the first indication information may be indicated in the form of a bitmap. For example, in the first SS block period, the SS block #1 in the first SS block period in the second SS block set is used to measure the synchronization signal, and the first SS block period has a bitmap of 1000; in the second SS block period, the SS block #2 and the SS block #3 in the second SS block period in the second SS block set are used to measure the synchronization signal, and the bitmap of the second SS block period is 0110; in the third SS block period, the SS block #4 in the third SS block period in the second SS block set is used to measure the synchronization signal, and the bitmap of the third SS block period is 0001; and in the fourth SS block period, the SS block #1 in the fourth SS block period in the second SS block set is used to measure the synchronization signal, and the bitmap of the fourth SS block period is 1000.

In an embodiment, if the measurement set is an SS block set, the configuration information includes at least one of the following: 1) a measurement period of a signal in the SS block; 2) a time offset; 3) second indication Information which is used to instruct the user equipment to adopt K designated signals in M designated SS blocks of the SS block subset in each SS block period to measure the synchronization signal, and wherein M and K are positive integers.

Specifically, the measurement for mobility management in the connected state is actually mainly for measuring the signal strength of the cell. If it is for this purpose, the user equipment measures only SSS, or only SSS and PBCH, or only SSS and PSS, or only SSS and part of PBCH, or only SSS and part of PSS, or only SSS, part of PSS and part of PBCH, and so on.

Figure 2I:
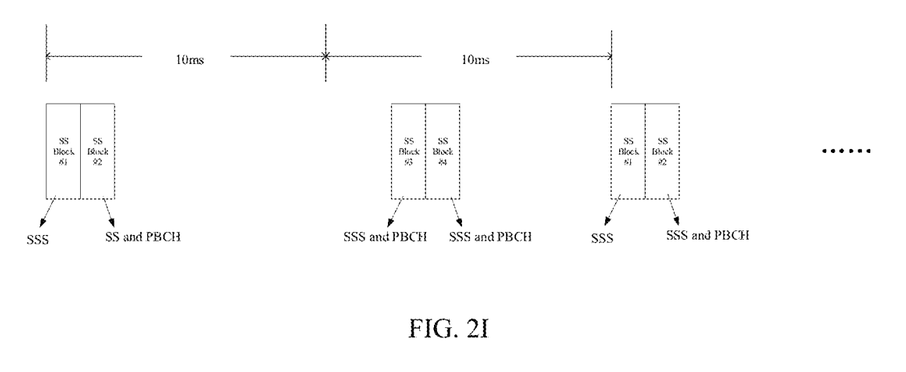
FIG. 2I is a schematic diagram of still another first SS block set provided by an embodiment of the present application.

For example, assuming that the configuration information includes the above conditions 1), 2), and 3), the second SS block set is as shown in FIG. 2B, the measurement period of a signal in the SS block is 20 ms, and the above time offset is time offset of measurement signals in 2 adjacent SS block periods, which is 10 ms; and in the first SS block period, SSS1 of the SS block #1 and SSS2 and PBCH2 of the SS block #2 in the first SS block period in the second SS block set are used to measure the synchronization signal; in the second SS block period, SSS3 and PBCH 2 of the SS block #3 and SSS4 and PBCH 4 of the SS block #4 in the second SS block period in the second SS block set are used to measure the synchronization signal; and in the third SS block period, SSS1 of the SS block #1 and SSS2 and PBCH2 of the SS block #2 in the third SS block period in the second SS block set are used to measure the synchronization signal, and so on and so forth. Then, according to the foregoing configuration information, the first SS block set can be known as specifically shown in FIG. 2I.

In addition, the second indication information may be indicated in the form of a bitmap.

In an embodiment, the configuration information further includes third indication information which is used to instruct the user equipment to measure the synchronization signal for W designated cells including a first cell and/or a second cell, wherein the first cell is a cell in which the user equipment is located, the second cell is a cell in which the user equipment is not located, and W is a positive integer.

Specifically, the third indication information is used to instruct the user equipment to measure the synchronization signal either for a cell where the user equipment is located, or for a cell where the user equipment is not located, or for a cell where the user equipment is located and a cell where the user equipment is not located, and the like. It is assumed that the third indication information is used to instruct the user equipment to measure the synchronization signal for a cell where the user equipment is located and a cell where the user equipment is not located, wherein the number of the synchronization signals measured for the cell wherein the user equipment is not located may be one or more, which is not limited in the application.

In an embodiment, when the designated cell includes the second cell, the configuration information further includes at least one of the following: 1) a cell ID of the second cell; 2) a frequency position at which the SS block of the second cell is located; 3) a time offset of the second cell from the first cell; 4) a period of the SS block of the second cell; 5) structure information of the SS block of the second cell.

Further, if the number of the second cells is R, and R is an integer greater than 1, the configuration information includes time offsets of the R second cells with the first cell, each of which is different.

Specifically, assuming that the user equipment simultaneously measures the first cell and the second cell, the configuration information includes a time offset of the second cell and the first cell. That is, when the synchronization signal of the cell where the user equipment is located and the synchronization signal of other cells are simultaneously measured, the time of the two cells is shifted by the time offset, through which the measurement efficiency can be improved. In addition, the network device informs the user equipment of structure information of the SS block of the second cell through the configuration information, which can improve the measurement efficiency.

In an embodiment, the signal set is a set of signals sent by the network device for the user equipment in a connected state to measure the synchronization signal.

Further, when the measurement set is the signal set, the network device first transmits the signals in the signal set before step S201.

In an embodiment, in a case that the measurement set is a signal set, the configuration information comprises at least one of the following: 1) composition of the signal set; 2) a resource used by a signal in the signal set, including at least one of a time resource, a frequency resource, and a code domain resource; 3) configuration information of designated cells including a first cell and/or a second a cell, wherein the first cell is a cell in which the user equipment is located, and the second cell is a cell in which the user equipment is not located.

Further, the number of the second cells may be one or more, and the present application is not limited thereto.

Specifically, the composition of the signal set indicates which signals the signal set is composed of, as specifically shown in FIG. 2E and FIG. 2F. The basic configuration information includes information of the common control channel, the carrier frequency width of the cell, and the like.

In an embodiment, the signal set comprises a first signal and a second signal which are any two signals in the signal set, and wherein in a case that the first signal and the second signal are from different cells, a resource corresponding to the first signal is different from that corresponding to the second signal, and the resource comprises at least one of a time resource, a frequency resource, and a code domain resource. That is, when any two signals in the signal set are from different cells, in order to prevent signals of different cells from interfering with each other, resources corresponding to signals of different cells in the signal set are arranged in different ways, as specifically shown in FIG. 2E and FIG. 2F.

In an embodiment, part of signals in the SS block includes at least one of an SSS, a PSS, and a Physical Broadcast Channel (PBCH).

Step S203: the user equipment receives the configuration information; and when the user equipment is in a connected state, the user equipment uses the measurement set to measure the synchronization signal.

In the solution provided by the present application, the measurement mechanism in which the user equipment is in an idle state is usually to direct at all SS blocks that the user equipment can find when the user equipment is in an idle state for initial access. When the user equipment is in the connected state, if the above method is also used, unnecessary waste of terminal resources is caused. Therefore, for the measurement mechanism of the synchronization signal when the user equipment is in the connected state, the network device configures the configuration information for the user equipment, and then sends the configuration information to the user equipment, so that the user equipment measures the synchronization signal based on the configuration information of the network device. This solution is more flexible than the forgoing method. Further, the mechanism for the user equipment to measure the synchronization signal is to measure based on the measurement set. If the measurement set is the first SS block set, the number of SS blocks included in the first SS block set is less than the number of SS blocks included in the second SS block set which includes a set of SS blocks used by the user equipment to measure the synchronization signal in an idle state. It can be seen that the measurement time of the present solution is shorter than that of the forgoing method, thereby improving the performance of the user equipment to detect the synchronization signal. In addition, if the measurement set is a signal set, the signal set includes part of signals in the Y SS blocks. It can be seen that the measurement time of the present solution is shorter than that of the forgoing method, thereby improving the performance of the user equipment to detect the synchronization signal.

It should be noted that FIG. 2B to FIG. 2I are only possible schematic diagrams provided by the present application, and are not limited thereto.

Figure 3:
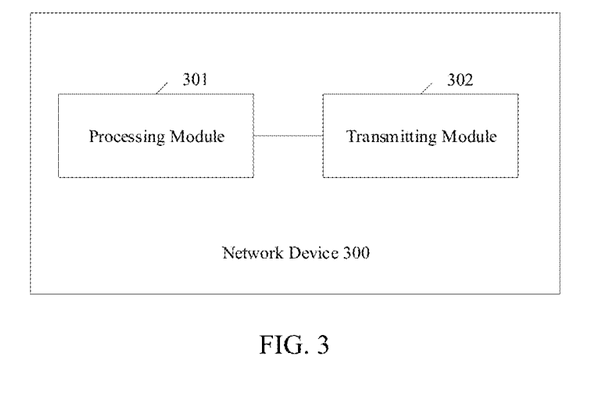
FIG. 3 is a schematic structural diagram of a network device according to an embodiment of the present application.

Embodiments of the present application further provide a network device 300, as shown in FIG. 3, including:

a processing module 301 configured to generate configuration information;

a transmitting module 302 configured to transmit the configuration information to a user equipment, wherein the configuration information is used to instruct the user equipment to use a measurement set to measure a synchronization signal, wherein the measurement set is used by the user equipment in a connected state to measure a synchronization signal, the measurement set is a first SS block set, and the number of SS blocks included in the first SS block set is smaller than the number of SS blocks included in a second SS block set which comprises an SS block set used by the user equipment in an idle state to measure a synchronization signal; or the measurement set is a signal set, and the signal set comprises a part of signals in Y SS blocks, and Y is a positive integer.

In an embodiment, the second SS block set is a set of SS blocks used when the user equipment is in an idle state for initial access, and the second SS block set comprises the first SS block set.

In an embodiment, the signal set is a set of signals sent by the network device for the user equipment in a connected state to measure the synchronization signal.

In an embodiment, when the measurement set is the first SS block set, the configuration information includes at least one of the following: 1) a measurement period of the SS block; 2) a time offset; 3) first indication information which is used to instruct the user equipment to adopt N designated SS blocks in the second SS block set in each SS block period to measure a synchronization signal, wherein N is a positive integer.

In an embodiment, if the measurement set is an SS block set, the configuration information includes at least one of the following: 1) a measurement period of a signal in the SS block; 2) a time offset; 3) second indication information which is used to instruct the user equipment to adopt K designated signals in M designated SS blocks of the second SS block set in each SS block period to measure the synchronization signal, and wherein M and K are positive integers.

In an embodiment, the configuration information further includes third indication information which is used to instruct the user equipment to measure the synchronization signal for W designated cells including a first cell and/or a second cell, wherein the first cell is a cell in which the user equipment is located, the second cell is a cell in which the user equipment is not located, and W is a positive integer.

In an embodiment, when the designated cell includes the second cell, the configuration information further includes at least one of the following: 1) a cell ID of the second cell; 2) a frequency position at which the SS block of the second cell is located; 3) a time offset of the second cell from the first cell; 4) a period of the SS block of the second cell; 5) structure information of the SS block of the second cell.

In an embodiment, in a case that the measurement set is a signal set, the configuration information comprises at least one of the following: 1) composition of the signal set; 2) a resource used by a signal in the signal set, including at least one of a time resource, a frequency resource, and a code domain resource; 3) configuration information of designated cells including a first cell and/or a second a cell, wherein the first cell is a cell in which the user equipment is located, and the second cell is a cell in which the user equipment is not located.

In an embodiment, the signal set comprises a first signal and a second signal which are any two signals in the signal set, and wherein in a case that the first signal and the second signal are from different cells, a resource corresponding to the first signal is different from that corresponding to the second signal, and the resource comprises at least one of a time resource, a frequency resource, and a code domain resource.

In an embodiment, part of signals in the SS blocks comprise at least one of a secondary synchronization signal (SSS), a primary synchronization signal (PSS), and a physical broadcast channel (PBCH).

It should be noted that each of the above modules (the processing module 301 and the transmitting module 302) is used to perform relevant steps of the above methods.

In this embodiment, the network device 300 is presented in the form of modules. A "module" herein may refer to an application-specific integrated circuit (ASIC), a processor and a memory that execute one or more software or firmware programs, integrated logic circuits, and/or other devices that can provide the above functionalities. In addition, the above processing module 301 can be implemented by the processor 501 of the network device shown in FIG. 5, and the transmitting module 302 can be implemented by the transceiver 503 of the network device shown in FIG. 5.

Figure 4:
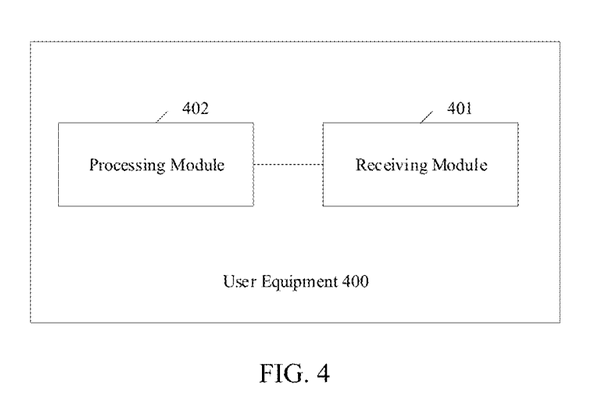
FIG. 4 is a schematic structural diagram of a user equipment according to an embodiment of the present application.

Embodiments of the present application further provide a user equipment 400, as shown in FIG. 4, including: a receiving module 401 and a processing module 402.

The receiving module 401 configured to receive the configuration information sent by a network device, wherein the configuration information is used to instruct the user equipment to use a measurement set to measure a synchronization signal, wherein the measurement set is used by the user equipment in a connected state to measure a synchronization signal, the measurement set is a first SS block set, and the number of SS blocks included in the first SS block set is smaller than the number of SS blocks included in a second SS block set which comprises an SS block set used by the user equipment in an idle state to measure a synchronization signal; or the measurement set is a signal set, and the signal set comprises a part of signals in Y SS blocks, and Y is a positive integer.

The processing module 402 configured to adopt the measurement set to measure a synchronization signal when the user equipment is in the connected state.

In an embodiment, the second SS block set is a set of SS blocks used when the user equipment is in an idle state for initial access, and the second SS block set comprises the first SS block set.

In an embodiment, the signal set is a set of signals sent by the network device for the user equipment in a connected state to measure the synchronization signal.

In an embodiment, when the measurement set is the first SS block set, the configuration information includes at least one of the following: 1) a measurement period of the SS block; 2) a time offset; 3) first indication information which is used to instruct the user equipment to adopt N designated SS blocks in the second SS block set in each SS block period to measure a synchronization signal, wherein N is a positive integer.

In an embodiment, if the measurement set is an SS block set, the configuration information includes at least one of the following: 1) a measurement period of a signal in the SS block; 2) a time offset; 3) second indication information which is used to instruct the user equipment to adopt K designated signals in M designated SS blocks of the second SS block set in each SS block period to measure the synchronization signal, and wherein M and K are positive integers.

In an embodiment, the configuration information further includes third indication information which is used to instruct the user equipment to measure the synchronization signal for W designated cells including a first cell and/or a second cell, wherein the first cell is a cell in which the user equipment is located, the second cell is a cell in which the user equipment is not located, and W is a positive integer.

In an embodiment, when the designated cell includes the second cell, the configuration information further includes at least one of the following: 1) a cell ID of the second cell; 2) a frequency position at which the SS block of the second cell is located; 3) a time offset of the second cell from the first cell; 4) a period of the SS block of the second cell; 5) structure information of the SS block of the second cell.

In an embodiment, in a case that the measurement set is a signal set, the configuration information comprises at least one of the following: 1) composition of the signal set; 2) a resource used by a signal in the signal set, including at least one of a time resource, a frequency resource, and a code domain resource; 3) configuration information of designated cells including a first cell and/or a second a cell, wherein the first cell is a cell in which the user equipment is located, and the second cell is a cell in which the user equipment is not located.

In an embodiment, the signal set comprises a first signal and a second signal which are any two signals in the signal set, and wherein in a case that the first signal and the second signal are from different cells, a resource corresponding to the first signal is different from that corresponding to the second signal, and the resource comprises at least one of a time resource, a frequency resource, and a code domain resource.

In an embodiment, part of signals in the SS blocks comprise at least one of a secondary synchronization signal (SSS), a primary synchronization signal (PSS), and a physical broadcast channel (PBCH).

It should be noted that each of the above modules (the receiving module 401 and the processing module 402) is used to perform relevant steps of the above methods.

In this embodiment, the user equipment 400 is presented in the form of modules. A "module" herein may refer to an application-specific integrated circuit (ASIC), a processor and a memory that execute one or more software or firmware programs, integrated logic circuits, and/or other devices that can provide the above functionalities. In addition, the above processing module 402 can be implemented by the processor 601 of the user equipment shown in FIG. 6, and the receiving module 401 can be implemented by the transceiver 603 of the user equipment shown in FIG. 6.

Figure 5:
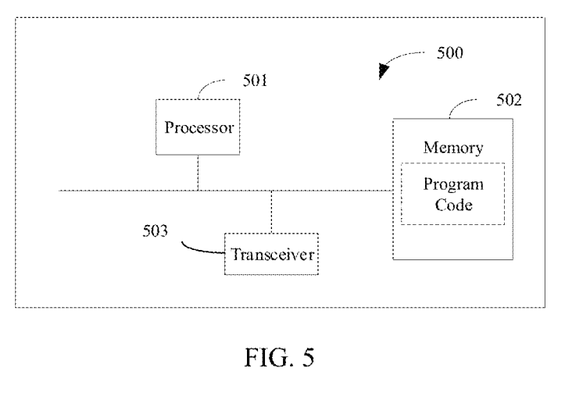
FIG. 5 is a schematic structural diagram of another network device according to an embodiment of the present disclosure.

As shown in FIG. 5, the network device 500 can be implemented in the structure of FIG. 5, which includes at least one processor 501, at least one memory 502, and at least one transceiver 503. The processor 501 is coupled to the memory 502 and the transceiver 503 via the communication bus so as to complete communications with each other.

The processor 501 can be a general purpose central processing unit (CPU), a microprocessor, an application-specific integrated circuit (ASIC), or one or more integrated circuits for controlling the execution of the above solution programs.

The transceiver 503 is configured to communicate with other devices or communication networks, such as Ethernet, Radio Access Network (RAN), Wireless Local Area Networks (WLAN), and the like.

The memory 502 can be a read-only memory (ROM) or another type of a static storage device that can store static information and instructions, a random access memory (RAM) or another type of a dynamic storage device that can store information and instructions, an Electrically Erasable Programmable Read-Only Memory (EEPROM), a Compact Disc Read-Only Memory (CD-ROM) or other optical disc storages and disc storage devices (including compact discs, laser discs, optical discs, digital versatile discs, Blu-ray discs, etc.), magnetic disk storage media or other magnetic storage devices, or any other media that can be used to carry or store a desired program code in the form of instructions or data structures and can be accessed by a computer, but not limited to this. The memory can exist independently and be connected to the processor via a bus. The memory can also be integrated with the processor.

The memory 502 is configured to store an application code for executing the above solutions, which is controlled by the processor 501 for execution. The processor 501 is configured to execute the application code stored in the memory 502.

The code stored in the memory 502 can be used to implement the method for measuring a synchronization signal performed by the network device as provided in the above, such as generating configuration information; transmitting the configuration information to a user equipment, wherein the configuration information is used to instruct the user equipment to use a measurement set to measure a synchronization signal, wherein the measurement set is used by the user equipment in a connected state to measure a synchronization signal, the measurement set is a first SS block set, and the number of SS blocks included in the first SS block set is smaller than the number of SS blocks included in a second SS block set which comprises an SS block set used by the user equipment in an idle state to measure a synchronization signal; or the measurement set is a signal set, and the signal set comprises a part of signals in Y SS blocks, and Y is a positive integer.

Figure 6:
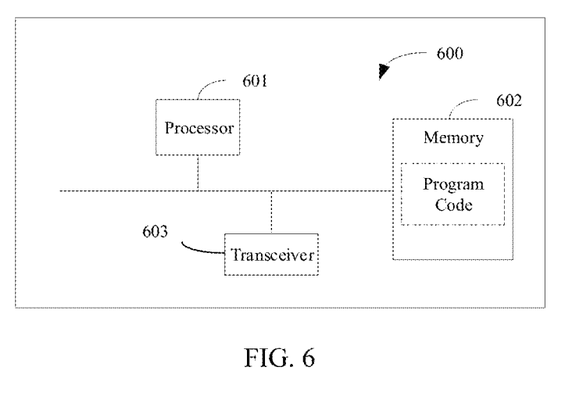
FIG. 6 is a schematic structural diagram of another user equipment according to an embodiment of the present application.

As shown in FIG. 6, the user equipment 600 can be implemented in the structure of FIG. 6, which includes at least one processor 601, at least one memory 602, and at least one transceiver 603. The processor 601 is coupled to the memory 602 and the transceiver 603 via the communication bus so as to complete communications with each other.

The processor 601 can be a general purpose central processing unit (CPU), a microprocessor, an application-specific integrated circuit (ASIC), or one or more integrated circuits for controlling the execution of the above solution programs.

The transceiver 603 is configured to communicate with other devices or communication networks, such as Ethernet, Radio Access Network (RAN), Wireless Local Area Networks (WLAN), and the like.

The memory 602 can be a read-only memory (ROM) or another type of a static storage device that can store static information and instructions, a random access memory (RAM) or another type of a dynamic storage device that can store information and instructions, an Electrically Erasable Programmable Read-Only Memory (EEPROM), a Compact Disc Read-Only Memory (CD-ROM) or other optical disc storages and disc storage devices (including compact discs, laser discs, optical discs, digital versatile discs, Blu-ray discs, etc.), magnetic disk storage media or other magnetic storage devices, or any other media that can be used to carry or store a desired program code in the form of instructions or data structures and can be accessed by a computer, but not limited to this. The memory can exist independently and be connected to the processor via a bus. The memory can also be integrated with the processor.

The memory 602 is configured to store an application code for executing the above solutions, which is controlled by the processor 601 for execution. The processor 601 is configured to execute the application code stored in the memory 602.

The code stored in the memory 602 can be used to perform the foregoing measurement method of the synchronization signal performed by the user equipment as provided in the above, such as receiving configuration information sent by a network device, wherein the configuration information is used to instruct the user equipment to use a measurement set to measure a synchronization signal, wherein the measurement set is used by the user equipment in a connected state to measure a synchronization signal, the measurement set is a first SS block set, and the number of SS blocks included in the first SS block set is smaller than the number of SS blocks included in a second SS block set which comprises an SS block used by the user equipment in an idle state to measure a synchronization signal; or the measurement set is a signal set, and the signal set comprises a part of signals in Y SS blocks, and Y is a positive integer; adopting the measurement set to measure a synchronization signal when the user equipment is in a connected state.

Embodiments of the present application further provide a communication system, including the network device 300 as shown in FIG. 3 and the user equipment 400 as shown in FIG. 4, or including the network device 500 as shown in FIG. 5 and the user equipment 600 as shown in FIG. 6.

Embodiments of the present application further provide a computer storage medium, wherein the computer storage medium can store a program, and the program, when being executed, includes some or all of the steps of any one of methods for measuring a synchronization signal described in the foregoing method embodiments.

Embodiments of the present application further provide another computer storage medium, wherein the computer storage medium can store a program, and the program, when being executed, includes some or all of the steps of any one of methods for measuring a synchronization signal described in the foregoing method embodiments.

It should be noted that, for the foregoing method embodiments, for the sake of simple description, they are all expressed as a series of action combinations, but those skilled in the art should understand that the present application is not limited by the described action sequences, because certain steps may be performed in other sequences or concurrently in accordance with the present application. In the following, those skilled in the art should also understand that the embodiments described in the specification are all exemplary embodiments, and the actions and modules involved are not necessarily required by the present application.

In the above embodiments, the descriptions of the various embodiments have different focuses, and the details that are not detailed in a certain embodiment can be referred to the related descriptions of other embodiments.

In the several embodiments provided herein, it should be understood that the disclosed apparatus may be implemented in other ways. For example, the embodiments of devices described above are merely schematic. For example, the partitioning of the units may be a partitioning in logical functions. There may be other manners for partitioning in actual implementation. For example, a plurality of units or components may be combined together or integrated into another system, or some features may be omitted or not be executed. In addition, mutual couplings or direct couplings or communication connections that are shown or discussed may be indirect couplings or communication connections through some interfaces, devices or units, and may be in electrical or other forms.

The units described as separated components may be or may not be physically separated. The components shown as units may be or may not be physical units, that is, they may be located in one place or may be distributed on a plurality of network units. Part or all of the units may be selected according to actual needs to achieve the purposes of the solutions of the embodiments of the present application.

In addition, all functional units in the embodiments of the present application may be integrated into one processing unit. Or, each unit exists independently in physics. Or, two or more units may be integrated into one unit. The above integrated units can be implemented in the form of hardware or in the form of a software functional unit.

The integrated units, if implemented in the form of a software functional unit and sold or used as a standalone product, may be stored in a computer readable memory. Based on such understanding, the technical solutions of the present application in essence or the part thereof providing contribution to the prior art, or all or part of the technical solutions may be embodied in the form of a software product which is stored in a memory and includes a number of instructions causing a computer device (which may be a personal computer, server or network device, etc.) to perform all or part of the steps of the methods described in various embodiments of the present application. The foregoing memory includes: a USB (Universal Serial Bus) flash disk, a Read-Only Memory (ROM), a Random Access Memory (RAM), a removable hard disk, a magnetic disk, or an optical disk, and the like, which can store program codes.

A person skilled in the art can understand that all or part of the steps of the foregoing embodiments can be completed by a program to instruct related hardware, and the program can be stored in a computer readable memory, and the memory can include: a flash drive, a read-only memory (referred to as: ROM), a Random Access Memory (referred to as: RAM), disk or CD, or the like.

In the solutions, the measurement mechanism of the user equipment in the connected state is to measure the synchronization signal based on the configuration information configured by the network device, and the solutions are more flexible than the measurement mechanism when the user equipment is in the idle state. In addition, the measurement mechanism of the user equipment is to measure the synchronization signal based on the measurement set which is a first SS block set, and the number of SS blocks included in the first SS block set is less than the number of SS blocks included in the second SS block set which includes all SS blocks used by the user equipment to measure the synchronization signal in an idle state, or the measurement set is a signal set which includes a part of signals in the Y SS blocks. Compared to following measurement when the user equipment is in an idle state, the measurement method of the present solution has a shorter measurement time, thereby improving the performance of the user equipment to detect the synchronization signal.

The embodiments of the present application have been described in detail above. The principles and implementations of the present application are described in the specific examples. The description of the above embodiments is only used to help understand the method and core ideas of the present application. A person of ordinary skill in the art, in view of the idea of the present application, is subject to change in the specific embodiments and the scope of application. To sum up, the content of the present specification should not be construed as limiting the present application

What is claimed is:

1. A method for measuring a synchronization signal, comprising:
generating, by a network device, configuration information;
transmitting, by the network device, the configuration information to a user equipment, wherein the configuration information is used to instruct the user equipment to use a measurement set to measure a synchronization signal, wherein the measurement set is used by the user equipment in a connected state to measure a synchronization signal and wherein the measurement set is a first synchronization signal block (SS block) set, and the number of SS blocks included in the first SS block set is smaller than the number of SS blocks included in a second SS block set which comprises an SS block used by the user equipment in an idle state to measure a synchronization signal;
wherein the configuration information comprises: a measurement period of a signal in the SS block; a time offset of measurement signals in two adjacent SS block periods; and second indication information which is used to instruct the user equipment to adopt K designated signals in M designated SS blocks of the second SS block set in each SS block period to measure a synchronization signal, and wherein M and K are positive integers; and wherein the configuration information further comprises third indication information which is used to instruct the user equipment to measure a synchronization signal for W designated cells including a first cell and a second cell, wherein the first cell is a cell in which the user equipment is located, the second cell is a cell in which the user equipment is not located, and W is a positive integer.

2. The method according to claim 1, wherein in a case that the designated cells include the second cell, the configuration information further comprises at least one of the following: a cell ID of the second cell; a frequency position at which the SS block of the second cell is located; a time offset of the second cell from the first cell; a period of the SS block of the second cell; and structure information of the SS block of the second cell.

3. A method for measuring a synchronization signal, comprising:

receiving, by a user equipment, configuration information sent by a network device, wherein the configuration information is used to instruct the user equipment to use a measurement set to measure a synchronization signal, wherein the measurement set is used by the user equipment in a connected state to measure a synchronization signal and wherein the measurement set is a first synchronization signal block (SS block) set, and the number of SS blocks included in the first SS block set is smaller than the number of SS blocks included in a second SS block set which comprises an SS block used by the user equipment in an idle state to measure a synchronization signal;

adopting, by the user equipment, the measurement set to measure a synchronization signal when the user equipment is in a connected state;

wherein the configuration information comprises: a measurement period of a signal in the SS block; a time offset of measurement signals in two adjacent SS block periods; and second indication information which is used to instruct the user equipment to adopt K designated signals in M designated SS blocks of the second SS block set in each SS block period to measure a synchronization signal, and wherein M and K are positive integers; and wherein the configuration information further comprises third indication information which is used to instruct the user equipment to measure a synchronization signal for W designated cells including a first cell and a second cell, wherein the first cell is a cell in which the user equipment is located, the second cell is a cell in which the user equipment is not located, and W is a positive integer.

4. The method according to claim 3, wherein in a case that the designated cells include the second cell, the configuration information further comprises at least one of the following: a cell ID of the second cell; a frequency position at which the SS block of the second cell is located; a time offset of the second cell from the first cell; a period of the SS block of the second cell; and structure information of the SS block of the second cell.

5. A user equipment, comprising a processor, a memory, a transceiver, and a communication bus, wherein the processor is coupled to the memory and the transceiver via the communication bus so as to complete communications with each other;

the memory stores executable program instructions, and the processor is configured to invoke executable program code in the memory to perform a method for measuring a synchronization signal comprising:

receiving configuration information sent by a network device, wherein the configuration information is used to instruct the user equipment to use a measurement set to measure a synchronization signal, wherein the measurement set is used by the user equipment in a connected state to measure a synchronization signal and wherein the measurement set is a first synchronization signal block (SS block) set, and the number of SS blocks included in the first SS block set is smaller than the number of SS blocks included in a second SS block set which comprises an SS block used by the user equipment in an idle state to measure a synchronization signal;

adopting the measurement set to measure a synchronization signal when the user equipment is in a connected state;

wherein the configuration information comprises: a measurement period of a signal in the SS block; a time offset of measurement signals in two adjacent SS block periods; and second indication information which is used to instruct the user equipment to adopt K designated signals in M designated SS blocks of the second SS block set in each SS block period to measure a synchronization signal, and wherein M and K are positive integers; and wherein the configuration information further comprises third indication information which is used to instruct the user equipment to measure a synchronization signal for W designated cells including a first cell and a second cell, wherein the first cell is a cell in which the user equipment is located, the second cell is a cell in which the user equipment is not located, and W is a positive integer.

6. The user equipment according to claim 5, wherein in a case that the designated cells include the second cell, the configuration information further comprises at least one of the following: a cell ID of the second cell; a frequency position at which the SS block of the second cell is located; a time offset of the second cell from the first cell; a period of the SS block of the second cell; and structure information of the SS block of the second cell.

* * * * *